United States Patent
Leisle

(10) Patent No.: US 7,328,183 B1
(45) Date of Patent: Feb. 5, 2008

(54) COMPUTER PROGRAM AND METHOD FOR DETERMINING THE ECONOMIC IMPACT OF LONG-TERM CARE

(75) Inventor: Ralph D. Leisle, Wildwood, MO (US)

(73) Assignee: LTCia, LLC, Wildwood, MO (US)

( * ) Notice: Subject to any disclaimer, the term of this patent is extended or adjusted under 35 U.S.C. 154(b) by 1762 days.

(21) Appl. No.: 09/638,779

(22) Filed: Aug. 15, 2000

(51) Int. Cl.
G06Q 40/00 (2006.01)
(52) U.S. Cl. .......................... 705/36 T; 705/4; 705/35
(58) Field of Classification Search ................ 705/36, 705/4, 35, 36 R, 36 T
See application file for complete search history.

(56) References Cited

U.S. PATENT DOCUMENTS

| | | | |
|---|---|---|---|
| 4,839,804 A | | 6/1989 | Roberts et al. |
| 5,136,502 A | | 8/1992 | Van Remortel et al. |
| 5,991,744 A | | 11/1999 | DiCresce |
| 6,009,402 A | | 12/1999 | Whitworth |
| 6,014,632 A | * | 1/2000 | Gamble et al. ............... 705/4 |
| 6,026,364 A | | 2/2000 | Whitworth |
| 6,163,770 A | * | 12/2000 | Gamble et al. ............... 705/4 |
| 6,253,192 B1 | | 6/2001 | Corlett et al. |
| 6,360,210 B1 | * | 3/2002 | Wallman ..................... 705/36 |
| 6,430,542 B1 | * | 8/2002 | Moran ......................... 705/36 |
| 6,516,303 B1 | * | 2/2003 | Wallman ..................... 705/36 |
| 6,584,446 B1 | * | 6/2003 | Buchanan et al. ............ 705/4 |
| 6,611,807 B1 | * | 8/2003 | Bernheim et al. ............ 705/4 |
| 6,684,190 B1 | * | 1/2004 | Powers et al. ............ 705/36 R |
| 2001/0032156 A1 | * | 10/2001 | Candura et al. ............ 705/36 |
| 2004/0138950 A1 | * | 7/2004 | Hyman et al. ............... 705/14 |

FOREIGN PATENT DOCUMENTS

| | | | |
|---|---|---|---|
| JP | 2001249971 A | * | 9/2001 |
| JP | 2001273370 | | 10/2001 |

OTHER PUBLICATIONS

"LTC Consultants—Training Specialists For Long-Term Care Insurance" web site. Retrieved from [URL:http://www.ltcconsultants.com/general/news/backgrounder.shtml] on Oct. 29, 2007.*

(Continued)

Primary Examiner—Susanna M. Diaz
(74) Attorney, Agent, or Firm—Thompson Coburn LLP; Clyde L. Smith, Esq.

(57) ABSTRACT

A computer program and method is provided that enables professional advisors, as well as individuals, to improve their understanding of the risks associated with long-term health care in effort to make informed decisions regarding long-term care insurance. The computer program and method projects an economic impact of long-term care costs on personal assets of an estate based upon a hypothetical fact scenario. In one aspect of the invention, tax consequences and other costs associated with the liquidation and sale of personal assets to pay long-term care costs are included in the determination of the economic impact. In another aspect of the invention, the computer program and method simultaneously determines both an insured hypothetical economic impact and an uninsured hypothetical economic impact on personal assets for any given hypothetical fact scenario. In yet another aspect of the invention, the economic impact is determined as a function of time.

14 Claims, 7 Drawing Sheets

OTHER PUBLICATIONS

Korn, Donald Jay. "Healthy, Wealthy And Wise." Financial Planning, Sep. 1, 2000.*

Leisle, Ralph D. "LTC Policies are Critical in Estate Planning." National Underwriter Life & Health-Financial Services Edition, vol. 104, No. 43, pp. 25, 32, Oct. 23, 2000.*

Rosenthal et al. "Balancing the Use of Public and Private Financing for Long-Term Care." Journal of the American Society of CLU & ChFC, vol. 47, No. 5, pp. 50-57, Sep. 1993.*

InsGift for Windows, the cash flow approach to estate and pension analysis, InsMark.

Comprehensive Planning: InsGift, Reprint from California Broker, Dec. 1997, vol. 16 No. 1.

Marketing Alert #110, Jan. 2000, InsMark.

Personal History and Financial Statement, InsMark, Inc., Copyright 1994, 1996-1999.

Client Information Summary, Self-Insure LTC Sample.

Client Information Summary, Insure LTC.

Long Term Care, Protecting Yourself from the Cost, StrateCision, Inc. Copyright 1993-2000, Serial # MC3JTSR2.

LTC Advisor Set-Up, Data Entry Screen Prints.

* cited by examiner

CLIENT DATA INSURED #1

| | | | | | |
|---|---|---|---|---|---|
| SSN | 000-00-0001 | HEALTH | PREFERRED | | |
| NAME | COUPLES | CHARLES | Q | | |
| | LAST | FIRST | MIDDLE | | |
| BIRTHDATE | 04/04/1941 | AGE: 59 | | | |
| PHONE | (111) 111-1111 | FAX | (111) 111-1112 | | |
| ADDRESS | 1015 ELM STREET | KIRKWOOD, MO 63122 | | | |

CLIENT DATA INSURED #2

| | | | | |
|---|---|---|---|---|
| SSN | 000-00-0011 | HEALTH | PREFERRED | |
| NAME | COUPLES | CATHY | Q | |
| | LAST | FIRST | MIDDLE | |
| BIRTHDATE | 01/01/1943 | AGE: 57 | | |
| eMAIL | SSSample@net.com | | | |

CARE DATA

ONE SPOUSE WILL NEED CARE FOR [5] YEARS BEFORE PASSING AWAY
THE NEED OF CARE WILL START AT THE BEGINNING OF [16] POLICY YEAR
CARE WILL BE FOR ⊙ INSURED #1 ○ INSURED #2
SURVIVING SPOUSE WILL LIVE FOR THE ENTIRE PLAN PERIOD OF [30] YEARS
CURRENT COST OF CARE IS $ [180] PER DAY
[5] % COMPOUND INFLATION INCREASES THE COST ANNUALLY

PLAN SCENARIO A

INSURANCE DATA

INSURANCE BENEFITS START AFTER A [90] DAY DEDUCTIBLE PERIOD
DAILY INSURANCE BENEFIT DURING THE FIRST POLICY YEAR IS $ [180]
MAXIMUM NUMBER OF YEARS OF BENEFITS IS [UNLIMITED]
INSURANCE BENEFITS INCREASE USING [COMPOUND] INFLATION
☐ ANNUAL INSURANCE PREMIUM INSURED #1 [$2,491]
☐ ANNUAL INSURANCE PREMIUM INSURED #2 [$2,133]

TAX & INVESTMENT DATA

CAPITAL GAINS OR OTHER TAX RATE [20]
INVESTMENT RETURN ASSUMPTION [6]
CONSULTANT [TOM TRUMP, CLU]

VERSION 1.03

FIG. 2

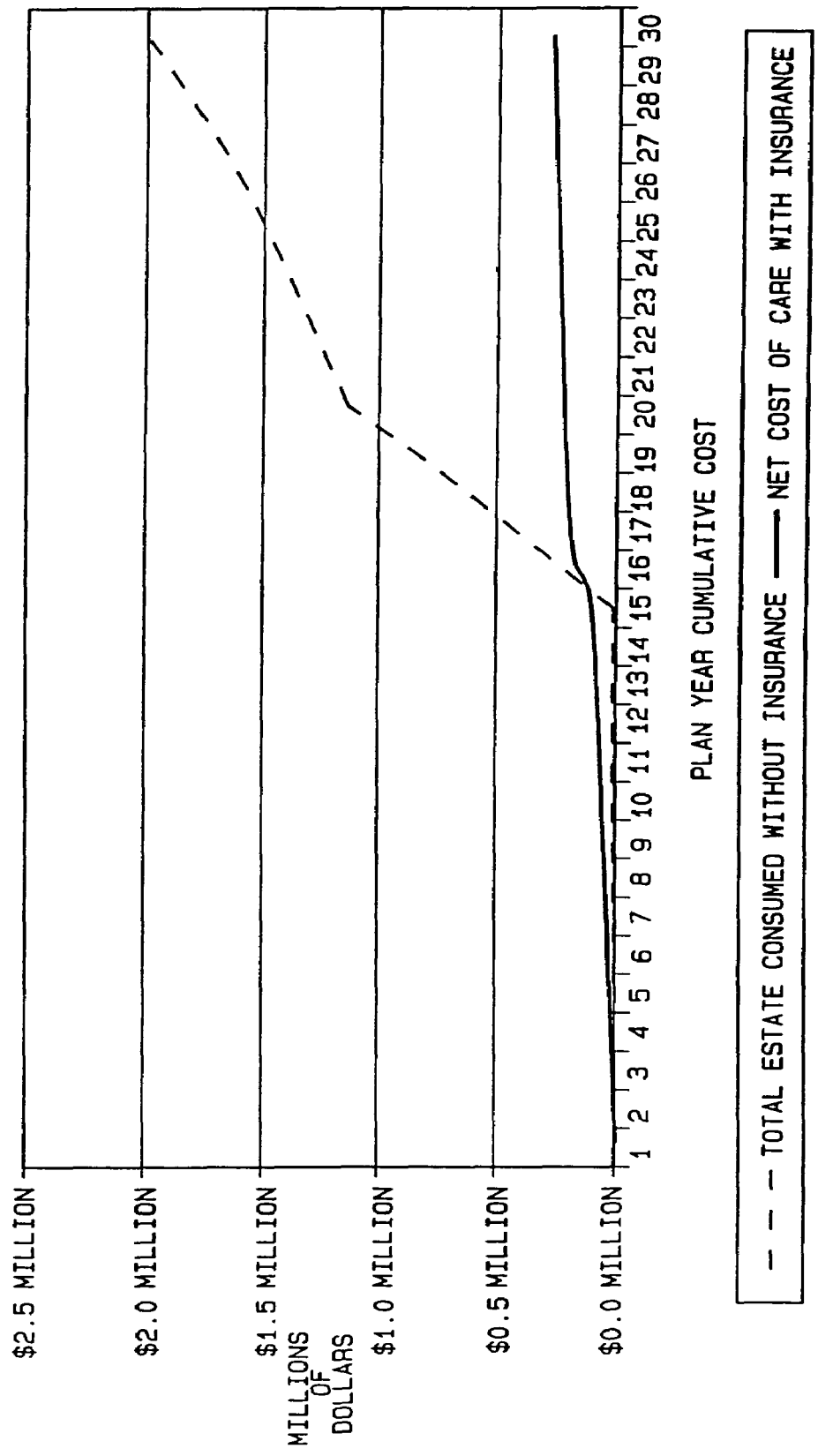

Economic Impact of Long Term Care
Summary Report
Charles Q couples & Cathy Q Couples
Scenario A

---

Based on the assumptions provided by you in this scenario, the following illustrates the economic impact on your estate for one person to receive 5 years paid 24 hour home or facility care. The insurance coverage selected in this scenario would pay claims for an unlimited number of years.

Other important assumptions have been used in the planning model. These include the recognition that investment assets are often sold to pay the cost of care and that income taxes will be imposed on the sale of those appreciated assets. The impact on investment growth is also included. When income or invested capital is used to pay for uninsured expenses those funds are no longer available for estate investment growth. You estimated a 6% investment return and a 20% capital gains tax in this scenario.

The planning model forecasts estate erosion with and without insurance. We expect you are insurable now but that may not always be the case. The projected erosion is based on the assumption one person will need 5 years of care during year 16 through 20 of the 30 year planning period.

The attached report illustrates the detailed calculations used to arrive at the following two key numbers. The first number projects $2.0 million dollar estate value reduction by the end of the plan period without insurance. The second key number shows that estate erosion is reduced to $0.2 million dollars when adjusted for the insurance benefit included in this scenario.

The intent of the estate impact model is to provide you better information on which to make planning decisions. Adjust assumptions and insurance coverage until you are comfortable with the degree of estate erosion projected in a final planning scenario.

Bottom Line

Individuals who have adequate assets to personally pay all potential long term costs don't need insurance, but it may be a sound economic solution!

None of the material in this presentation should be construed as either advise or interpretation of legal or tax code. Please consult with those advisors to determine how these concepts may apply in your particular situation.

FIG. 5

Economic Impact - Cost of Care for Five Years

Note: Each individual's situation is different. Actual numbers will vary depending on rates on return, cost of care, tax rates and basis of assets, etc.

Assumptions
- Five Years LTC @ $180 current cost
- 5% Compound Inflation - LTC Costs
- Surviving Partner Lives 10 additional years
- 6% Return on Investments, 20% Capital Gains Tax Rate
  - Assumes zero basis on liquidated assets
  - Traditional IRA distributions are fully taxable Total Reduction in Estate Value Due to LTC Costs: $2.0 Million

Annual Cost of Care

| Plan Year | Care Year | Cost of Care | Capital Gains Taxes | Investment Opportunity Loss @ 6% | Total Annual Cost |
|---|---|---|---|---|---|
| 16 | 1 | $136,585 | $34,146 | $10,244 | $180,976 |
| 17 | 2 | $143,415 | $35,854 | $21,615 | $200,883 |
| 18 | 3 | $150,585 | $37,646 | $34,205 | $222,437 |
| 19 | 4 | $158,115 | $39,529 | $48,116 | $245,760 |
| 20 | 5 | $166,020 | $41,505 | $63,455 | $270,980 |

Cumulative Cost of Care

| Plan Year | Age | Current Year Total Cost | Cumulative Dollars Consumed |
|---|---|---|---|
| 1 - 15 | 59 / 57 |  | No paid LTC Required |
|  | 74 / 72 |  |  |
| Care Begins |  |  |  |
| 16 | 75 / 73 | $180,976 | $180,976 |
| 17 | 76 / 74 | $200,883 | $381,859 |
| 18 | 77 / 75 | $222,437 | $604,296 |
| 19 | 78 / 76 | $245,760 | $850,056 |
| 20 | 79 / 77 | $270,980 | $1,121,036 |
| Survivor |  |  |  |
| 21 | / 78 | $67,262 | $1,188,299 |
| 22 | / 79 | $71,298 | $1,259,597 |
| 23 | / 80 | $75,576 | $1,335,172 |
| 24 | / 81 | $80,110 | $1,415,283 |
| 25 | / 82 | $84,917 | $1,500,200 |
| 26 | / 83 | $90,012 | $1,590,212 |
| 27 | / 84 | $95,413 | $1,685,624 |
| 28 | / 85 | $101,137 | $1,786,762 |
| 29 | / 86 | $107,206 | $1,893,968 |
| 30 | / 87 | $113,638 | $2,007,606 |

Total Reduction in Estate Value Due to LTC Costs $2.0 Million

FIG. 6

Economic Impact - Insurance Benefits and Premium Cost

Note: Each individual's situation is different. Actual numbers will vary depending on rates on return, cost of care, tax rates and basis of assets, etc.

Policy Benefit Design:

- Unlimited years of benefits
- Daily benefit 1st year $180 (benefit doubles every 14.4 years)
- 5% Compound Inflation
- 90 day Elimination or Waiting Period
- Waiver of Premium (when benefit starts)
- 100% of the dollars available for home care, assisted living, or nursing home facility
- Charles Couples qualifies for Preferred rate
- Cathy Couples qualifies for Preferred rate
  (Assumption: Actual rating determined by selected insurance companies.)

Policy Claims Payments: (Payments start after 90 day elimination period.)

| Policy Year | Benefit Days | Daily Benefit | Annual Benefit |
|---|---|---|---|
| 16 | 275 | $374 | $102,907 |
| 17 | 365 | $393 | $143,415 |
| 18 | 365 | $413 | $150,585 |
| 19 | 365 | $433 | $158,115 |
| 20 | 365 | $455 | $166,020 |

| | |
|---|---|
| Total Payments from Insurance Company | $721,042 |
| 30 year Cumulative Benefit | $1,906,714 |
| Potential dollars if lifetime benefit option | Unlimited |

Projected Premium Expense:

| | |
|---|---|
| Annual Premium $2491 / $2133 | |
| Both Insured, 15 years x $4624 | $69,360 |
| One Insured, 15 years x $2133 | $31,995 |
| Premium is waived during benefit period. | |
| Total Premium Expense | $101,355 |
| Total Cumulative Cost of Insurance | $134,295 * |
| * See Planning Model Assumptions and Attachments A, B and C. | |

FIG. 7

COMPUTER PROGRAM AND METHOD FOR DETERMINING THE ECONOMIC IMPACT OF LONG-TERM CARE

BACKGROUND OF THE INVENTION (1) Field of the Invention

This invention pertains to the field of long-term health care insurance. More particularly, this invention pertains to a computer program and method for use aiding persons in the complex societal and individual decision process of assessing risk and risk mitigation options regarding potential long-term custodial care needs required in a personal residence or care facility due to cognitive impairment or inability to independently perform significant activities of daily living as a result of accidents or chronic health related conditions that may be required by one or more family members.

(2) Description of the Related Art

Various methods and software applications have been developed for use in the estate planing, financial advising, and insurance industries for the purpose of forecasting potential economic risks. Software developed for insurance companies that offer long-term health care insurance typically focus on calculating one or more of insurance benefits, potential growth of benefit dollars depending upon selectable inflation options, and insurance premiums. Additionally, software programs are available that compare the benefits offered by various insurance plans, which in some cases automatically determine the lowest premium based on specific criteria. Furthermore, programs exist that are configured to project future cost of care based on program parameters and user input.

However, it is desirable to improve the ability of persons such as advisors, insurance brokers, estate planers, and potential health care recipients to quickly and effectively observe the magnitude of risks associated with long-term health care under varying scenarios. Furthermore, it is desirable to provide a comprehensive, coordinated software application capable of generating analytic reports driven by specific client input related to the personal goals and objectives of the client in a manner that allows rapid risk assessment of the potential economic impact of long-term care on personal assets.

SUMMARY OF THE INVENTION

The present invention enables professional advisors, as well as individuals, to improve their understanding of the risks associated with long-term health care in effort to make informed decisions regarding long-term care insurance. By utilizing factors not previously considered to generate hypothetical economic impacts on personal assets under various scenarios, the present invention provides a powerful tool for obtaining a more accurate prediction of potential economic impacts of long-term care insurance decisions.

One aspect of the preferred embodiment of the present invention is the consideration of tax consequences and other costs such as penalties and transactional fees associated with the liquidation and sale of personal assets to pay long-term care costs (hereinafter referred to generally as tax consequences). Due to the large expenses associated with long-term care, it is often necessary to liquidate personal assets. The preferred embodiment takes the tax consequences into account when calculating potential economic impacts of long-term care costs by upwardly adjusting the value of personal assets required to be sold to pay such long-term costs. Thus the projected economic impact is made more accurate than it would otherwise be. For a fair assessment of the benefits of a given insurance plan, the preferred embodiment also assumes that insurance premiums are paid from the sale of such assets and, therefore, also includes calculations to reflect tax consequences of selling personal assets to pay the insurance premiums.

Another aspect of the preferred embodiment lies in its ability to simultaneously generate both an insured hypothetical economic impact and an uninsured hypothetical economic impact on personal assets for any given hypothetical fact scenario. This aspect of the preferred embodiment allows users to compare the net differences between being insured versus uninsured under any given fact scenario and to weigh risks accordingly. By changing the hypothetical fact scenario, this aspect of the preferred embodiment also allows users to quickly balance the benefits provided by a given insurance plan with the costs of making insurance premium payments.

Yet another aspect of the preferred embodiment of the invention is that the economic impact is determined as a function of time. This aspect of the preferred embodiment allows users to quickly understand how the passage of time influences the hypothetical economic impact of long-term care costs on personal assets. Additionally, the determination of the economic impact of long-term care costs in the preferred embodiment includes calculations of unrealized investment opportunity that presumably would have been realized from assets hypothetically sold to pay long-term care costs and further allows determination of the economic impact at a point in time beyond the time of which care is presumed to be given. Thus, by determining the economic impact as a function of time, the preferred embodiment allows users to appreciate the significance of the unrealized investment opportunity and the impact thereof on such persons as a surviving spouse of the person presumed to have received the long-term care.

While the principle advantages and features of the present invention have been described above, a more complete and thorough understanding of the invention may be attained by referring to the figures and the detailed description of the preferred embodiment, which follow.

BRIEF DESCRIPTION OF THE FIGURES

FIG. 2 shows the data entry window of the preferred embodiment of the invention.

FIG. 3 is a line-chart generated by the preferred embodiment showing both insured and uninsured economic impacts of long-term care costs as a function of time based on a hypothetical fact scenario.

FIG. 5 is a summary report of the economic impact generated by the preferred embodiment for the fact scenario.

FIG. 6 is a detailed report of the uninsured economic impact of the long-term care cost generated by the preferred embodiment for the fact scenario.

FIG. 7 is a detailed report of the insured economic impact of the long-term care costs generated by the preferred embodiment for the fact scenario.

DETAILED DESCRIPTION OF THE PREFERRED EMBODIMENT

Figure 1:
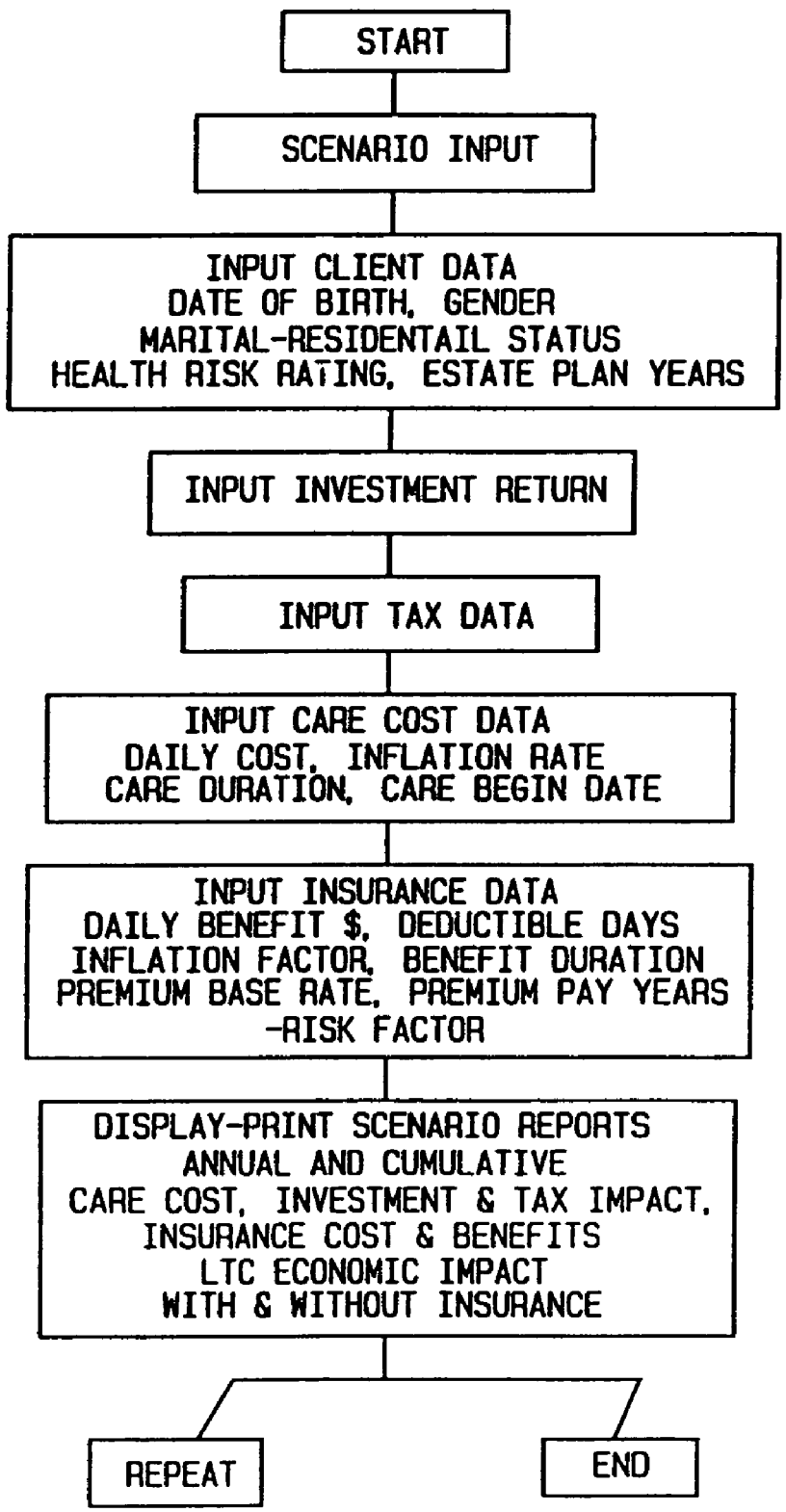
FIG. 1 is a flow chart of the procedure of data entry and use of the preferred embodiment of the invention.

The preferred embodiment of the invention comprises the use of a computer program written in VISUAL BASIC®, the source code of which is provided as Appendix-A. In general, the preferred embodiment is configured to accept input of a fact scenario comprising client variables, care cost variables, insurance variables, and investment and tax variables. From this fact scenario, the preferred embodiment calculates an insured and uninsured economic impact on personal assets based on the data entered and outputs this information both graphically and in report form. The basic flow structure of the preferred embodiment is shown in the block-diagram of FIG. 1. The preferred embodiment is also configured to allow the rapid recalculation of both an insured and uninsured economic impact by allowing the user to return to the data entry phase of the program after calculations and reports have been made and to modify one or more of the fact scenario variables without re-entering any of the variables intended to remain unchanged.

To facilitate data entry, the preferred embodiment is configured to allow a user to enter all desired variables from a single formatted data entry window as shown in FIG. 2. The data entry window of the preferred embodiment utilizes default values for many of the data entry fields. Additionally, data entry fields requiring specific predefined options preferably utilize drop-down menus to facilitate data entry therein.

In addition to data used to generate economic impact predictions, the preferred embodiment also allows entry of variables such as the consultant's name or code number, client names, client addresses and phone numbers, and client social security numbers. While these variables are not used for economic impact predictions, they facilitate the storage and retrieval of client scenarios.

The variables shown in the data entry window are also preferably arranged in organized groupings. As shown in FIG. 2, the data entry window of the preferred embodiment has a plurality of client data groupings 20, 22 for entry of general information regarding a person for which the economic impact prediction is sought, and for his or her spouse. In addition to the client data groupings 20, 22, the data entry window has a care data grouping 24, an insurance data grouping 26, and a tax and investment data grouping 28.

Of the information entered in each of the client data groupings 20, 22, a health entry field and a birth date entry field provide information used by the preferred embodiment to compute the annual insurance premium figures shown in the insurance data grouping 26 as described below. The value of the health entry field is preferably selected from a drop-down menu containing various risk or status scales commonly used and known in the insurance industry to determine insurance premiums and preferably defaults to a "preferred" risk or status. Likewise, the value entered in the birth date entry field is also used to calculate the insurance premiums which are often dependent upon client age. The remainder of the data entry fields of the client data groupings 20, 22 facilitate the storage and retrieval of client scenarios as mentioned above.

The care data grouping 24 contains data entry fields used to simulate and alter a future hypothetical scenario of long-term health care expenses that will be incurred due to a hypothetical extended period of paid personal care required in a personal residence or care facility due to cognitive impairment or inability to independently perform significant activities of daily living as a result of accidents or chronic health related conditions. Included in the care data grouping 24 are entry fields for the hypothetical duration of time in which care will be needed, the duration of time before the care will be needed, which of the persons identified in the client data groupings is presumed will need the care, the duration of the insurance plan, the current periodic cost of the care, and a periodic rate of inflation of the cost of the care. With the exception of value of the current periodic cost of the care data field, the values of the data fields of the care data grouping 24 are predictions or forecasts of future events. The value of the current periodic cost of the care data field represents the present-day costs of health care and can be adjusted to represent various degrees of hypothetical long-term care needs and/or to adjust for such things as region-to-region variations in costs of long-term care.

The insurance data grouping 26 contains data fields used to calculate costs and benefits of insuring one or more of the clients against long-term health care expenses. The fields of the insurance data grouping 26 include a duration of time of deduction entry field, a periodic current benefit receivable entry field, a duration of time in which benefits are receivable entry field, a method of determining inflation of benefits receivable entry field, and data fields for a periodic insurance premium for each of the persons identified in the client data groupings 20, 22. Although the values of these data fields are preferably obtained from specific insurance plans, the preferred embodiment allows alteration of the value of each of these fields independently. The duration of time of deduction entry field, duration of time in which benefits are receivable entry field, and the method of determining inflation of benefits receivable entry field preferably utilize drop-down menus to facilitate the data entry therein. The entry in the inflation of benefits data field is preferably either simple, compound, or none. The values of each of the periodic insurance premium data fields preferably automatically default to values determined from preprogrammed premium base rates dependent upon the values of the health entry field and birth date entry field of the client data groupings 20, 22 and the remaining fields of the insurance data grouping 26. These preprogrammed premium base rates are well known to those skilled in the insurance industry and can be customized for specific insurance plans as needed. However, as mentioned above, the preferred embodiment allows the automatic default value of each of the periodic insurance premium data fields to be overridden if so desired.

The tax and investment data grouping 28 includes a tax rate entry field and a periodic rate of return on investments entry field. The tax rate entry field is for the entry of a projection of a percent rate of loss that would be incurred on the sale of personal assets due to capital gains or other projected expenses of asset liquidation. The periodic rate of return on investments entry field is for the entry of a projected periodic appreciation rate of personal assets.

The preferred embodiment calculates the economic impact on the long-term care costs only after the data has been entered. In other words, calculations of the economic impact are not performed automatically as the value in each data field is changed. This eliminates unnecessary calculations from being made during the data entry phase of the application. However, from the data entry window, the user can toggle or switch to an output mode or report mode. When this is done, calculations are automatically performed on the data contained in the entry window and the user need not manually instruct the program to perform such calculations.

As mentioned above, the software of the preferred embodiment calculates both an insured and uninsured economic impact for any given scenario of data in the data entry window. Any given economic impact is preferably calculated as a monetary loss of personal assets of an estate. Thus the uninsured economic impact preferably represents the loss of personal assets from an estate assuming that all long-term care costs are paid from estate assets and that no payments of insurance premiums are made. Likewise, the insured economic impact preferably represents the loss of personal assets from an estate assuming that insurance benefits offset at least a portion of the long-term care costs, all remaining long-term care costs are paid from estate assets, and that the insurance premiums are paid from the estate assets.

The software of the preferred embodiment also calculates the insured and uninsured economic impact as a function of time. This is preferably done by calculating the insured and uninsured economic impact on personal assets for the first year of the duration of the insurance plan and then "stepping" through each successive year for the number of years listed in the duration of the insurance plan field of the care data grouping 24, the total impact being the sum of all years.

In the preferred embodiment, both premium payments and the uninsured portion of care costs contribute to the economic impact of long-term care on personal assets. Additionally, it is assumed that both the premium payments and the uninsured portion of care costs are paid from estate assets are therefore subject to tax consequences upon liquidation. Furthermore, the determination of the economic impact of long-term care on personal assets takes into account unrealized investment opportunity in excess of merely determining the value of the portion of assets that must be sold to pay the premium payments, the uninsured portion of care costs, and the taxes thereon.

The calculations of both an uninsured economic impact on personal assets as well as an insured economic impact are essentially identical except that the calculations of the uninsured economic impact assume that the insurance premiums and the insurance benefits are zero. Thus, for purposes of describing the preferred embodiment, the following description includes a description of how the insurance benefits and premium payments affect the calculation of the economic impact, but it should be understood that the insurance benefits and premium payments are zero when determining the uninsured economic impact. Furthermore, in some scenarios, the hypothetical care is assumed to occur only after several years into the duration of the plan and/or to terminate prior to ending year of the scenario. In such situations, the care costs are assumed to be zero for those years prior and after the period in which the care is needed.

For purposes of describing the calculations used by the preferred embodiment to determine the economic impact, it is helpful to first identify and describe certain terms. Additionally, because the preferred embodiment determines the economic impact by "stepping" through each successive year of the plan, the calculations are described for only a given year and it should be understood that the calculations are repeated for each successive year.

The term economic impact refers to the economic impact incurred from the commencement of the scenario up to and including the given calculation year and the term incremental economic impact refers to the change in the economic impact during the given calculation year. The term prior economic impact refers to the economic impact minus the incremental impact (i.e. the economic impact as calculated the previous year). Additionally, the term care costs in the description which follows refers to the charge for long-term health services, regardless of whether such charge is covered by insurance.

Several components preferably contribute to the incremental economic impact. One component is the uninsured care cost. The uninsured care cost is calculated as the amount by which the care costs exceed the insurance benefits. The care costs equal zero during the all years within the duration of time before the care will be needed, as entered in the data entry window. After this point in time, care costs are calculated as described below for the number of years entered in the data entry window in the duration of time in which care will be needed data field, after which they once again equal zero. Likewise, the insurance benefits equal zero when the care costs equal zero.

When applicable, the care costs for the given year are determined by converting the current periodic cost of the care to a yearly figure and adjusting the value for the given year by assuming compound annual inflation at the periodic rate of inflation which was entered in the data entry window.

The insurance benefits for the given year are determined by converting the periodic current benefit receivable to a yearly figure and reducing the value, if applicable, to account for the duration of time of deduction entered in the data entry window. The reduction of the insurance benefits to account for the deduction period only applies to the first year having non-zero care costs. The insurance benefits are also adjusted for inflation by either compound or simple inflation, if so selected in the data entry window. Additionally, in general insurance benefits are set equal zero after being calculated for more years than are entered in the data field for the duration of time in which benefits are receivable, unless of course the duration of time in which benefits are receivable is unlimited. However, if there was a deductible period as described above, benefits are presumed to be received during the next following year, but only for the deduction period.

A second component of the incremental economic impact is the insurance premium payments. The annual insurance premium payments are determined from values of each of the periodic insurance premium data fields of the data entry window, which in the preferred embodiment are yearly values and therefore need not be adjusted. The insurance premium payments equal the combined values of each of the periodic insurance premium data fields of the data entry window during the all years within the duration of time before the care will be needed as entered in the data entry window. For those years after, the insurance premium value is equal to zero for the person presumed to be receiving the care (the person presumed to be receiving the care is designated in the data field the care data grouping 24 of the data entry window). However, payment of the periodic insurance premium is assumed to continue throughout the entire duration of the insurance plan for all other persons, if any such persons were included in the data entry window. If no such other persons were included in the data entry window, the duration of the insurance plan is typically given a value such that the calculations end in the year the care is presumed to end, but this can be extended to represent an ongoing economic impact to such persons as potential beneficiaries of the estate.

A third component that contributes to the incremental economic impact is a presumed tax consequence of the sale of personal assets. In the preferred embodiment, it is presumed that a portion of the personal assets must be liquidated to cover the uninsured care costs and the insurance premium payments. The tax consequences represent losses due to taxes on capital gains and/or other expenses associated with the liquidation of the portion of the personal assets. In the preferred embodiment, the portion of the estate presumably required to be liquidated is calculated by dividing the sum of the uninsured care costs and the insurance premium payments by one minus the tax rate entered in the tax and investment data grouping 28 of the data entry window. Additionally, the tax rate of the preferred embodiment represents a percentage and thus is first divided by one-hundred before being subtracted from one. In the preferred embodiment, the calculated value of the portion of the estate presumably required to be liquidated inherently includes the tax consequences and it therefore unnecessary to determine the tax consequences alone. However, if desirable, the tax consequences can be calculated as the difference between the portion of the estate presumably required to be liquidated and the sum of the uninsured care costs and the premium payments.

A fourth component that contributes to the incremental economic impact is a presumed loss due to an unrealized investment opportunity. The unrealized investment opportunity represents a projected amount of appreciation that would have been realized on the portion of the personal assets liquidated in the given year plus a projected amount of appreciation that would realized but for the prior economic impact on the personal assets. Hence, the calculation of unrealized investment opportunity for any given year takes the prior economic impact into account and thus continues to increase the economic impact in years without care costs. The unrealized investment opportunity is preferably determined by multiplying both the value of the portion of the personal assets presumably liquidated in the given year and the prior economic impact by the presumed yearly rate of return on investments. In the preferred embodiment, the rate of return on investments is entered as a yearly percent gain in data entry window and, as such, is merely divided by one-hundred when calculating the unrealized investment opportunity.

Using the above described components, the incremental impact for any given year is equal to the portion of the assets that presumably must be liquidated (which itself equals the sum of the uninsured care cost, the insurance premium payments, and the tax consequences), plus the unrealized investment opportunity, plus the prior economic impact. As mentioned above, calculations are preferably made for both an insured and uninsured economic impact for each year of a scenario.

Figure 4:
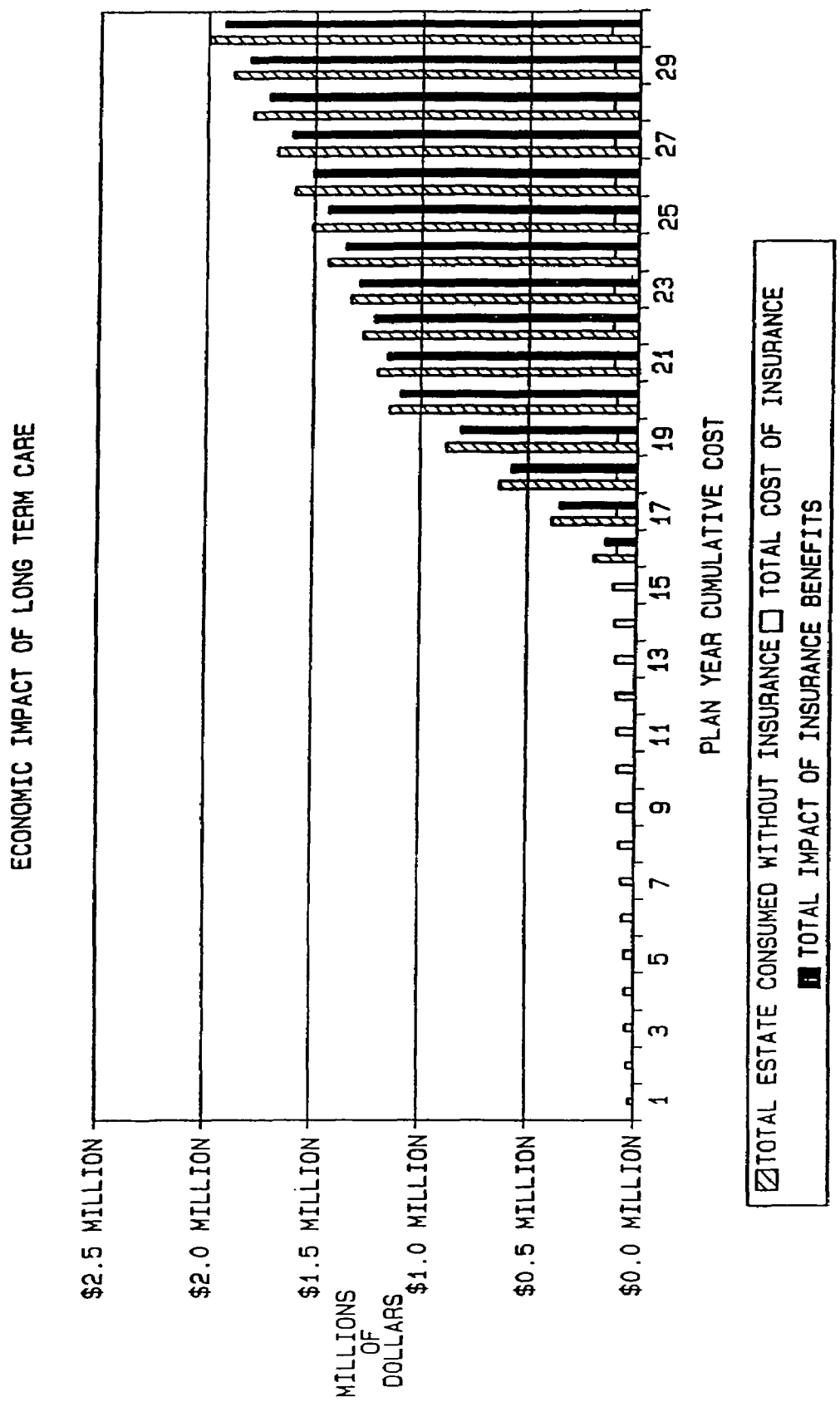
FIG. 4 is a bar-chart generated by the preferred embodiment showing the uninsured economic impact of long-term care costs, the total cost of insurance, and the total impact of insurance benefits as a function of time based on the fact scenario.

In the preferred embodiment, the software used to calculate the above mentioned insured and uninsured economic impacts also automatically generates multiple graphs and reports to facilitate the output of the calculations. FIGS. 3 and 4 represent two graphs generated by the software of the preferred embodiment.

FIG. 3 is a line-graph of the total estate consumed without insurance and the net cost of care with insurance plotted as a function of time for a given scenario. The total estate consumed without insurance is equivalent to the uninsured economic impact of the personal assets as calculated above. Likewise, the net cost of care with insurance is equal to the insured economic impact as calculated above. Use of this graph or chart allows visual comparison of being insured versus uninsured for the given hypothetical fact scenario.

FIG. 4 is a bar-graph showing the total estate consumed without insurance, the total cost of insurance, and the total impact of insurance benefits plotted as a function of time for the scenario used to generate FIG. 3. Like in FIG. 3, the total estate consumed without insurance in FIG. 4 is equivalent to the uninsured economic impact of the personal assets as calculated above. The total cost of insurance is determined from the insurance premium payments, including the aforementioned tax consequences and losses due to unrealized investment opportunities. The total impact of insurance benefits is determined as the sum of the insurance benefits received, the tax consequences from the sale of assets that would have been necessary but for receiving the insurance benefits, and the unrealized investment opportunity that would have been incurred but for receiving the insurance benefits. The purpose of this chart is to show separately the impact of long-term care costs, premium costs, and the total economic value of the of the insurance benefits alone, without having to interpolate these values from other output.

The preferred embodiment also produces reports. FIG. 5 is a summary report for the given fact scenario. The summary report lists the basic assumptions entered in the data entry window and indicates both the uninsured and insured economic impact of long-term care cost on personal assets as calculated for the last year of the hypothetical fact scenario.

FIG. 6 is a detailed report showing the various components contributing to the calculation of the uninsured economic impact of the long-term care cost on personal assets. The information on the this report is broken down for various years of the fact scenario to facilitate the client's understanding of when certain factors become significant. For example, the unrealized investment opportunity or investment opportunity loss as shown gradually becomes a much larger factor of the economic impact than the tax consequences or capital gains taxes as shown.

FIG. 7 is a detailed report of the hypothetical insurance benefits and the cost of the insurance premiums. This report allows users to appreciate the total costs of insurance versus the value of the actual benefits received.

The graphs and reports allow for rapid communication of the economic impact calculations for any given fact scenario. By returning to the data entry window, a user can alter or adjust one or more of the entries of the data fields and thereby quickly compare various scenarios. In addition to comparing insured versus uninsured economic impacts under a given fact scenario, the user is able compare different insurance plans to weigh the benefits of such a plans against their costs.

While the invention has been described in reference to the preferred embodiment, it should be understood the numerous variations could be made without departing for the scope of the invention. As an example, various data entry fields for use in calculating the economic impact or for storing and retrieving scenarios could be added or eliminated in alternative embodiments of the invention. Additionally, the calculation of economic impact, although not preferred, could occur automatically as data is entered in the data entry window. Furthermore, the economic impact could be determined in terms of the value of an estate rather than as the economic loss thereto. Thus, it should be understood that modifications and variations of the invention may be constructed without departing from the scope of the invention defined in the following claims.

What is claimed is:

1. A computer program product having embodied thereon machine readable and machine executable software, comprising:

a storage routine adapted and configured to store, in a storage device, user-controlled data indicative of a hypothetical scenario of future long-term care costs and of one of a plurality of long-term care insurance options;

a first process routine adapted and configured for using the stored data to determine an insured economic impact of the long-term care costs on personal assets, the first process routine including calculations to account for hypothetical tax consequences resulting from a sale of a portion of a first portion of the personal assets to pay the long-term care costs and calculations to account for periodic premium payments and monetary insurance benefits received, the hypothetical tax consequences being accounted for by assuming that any long-term care costs in excess of the monetary insurance benefits and all of the insurance premiums are paid for by the sale of the first portion of the personal assets; the first process routine also including calculations to account for hypothetical unrealized investment opportunity resulting from an absence of the first portion of the personal assets due to the sale the first portion of the personal assets; and a second process routine adapted and configured for using the stored data to determine an uninsured economic impact of the long-term care costs on the personal assets, the second process routine being adapted and configured for using the stored data to determine an uninsured economic impact including calculations to account for hypothetical tax consequences resulting from a sale of a second portion of the personal assets to pay the long-term care costs and calculations to account for hypothetical unrealized investment opportunity resulting from an absence of the second portion of the personal assets due to the sale of the second portion of the personal assets, the uninsured economic impact being independent of any periodic premium payments and any monetary insurance benefits received.

2. The computer program product of claim 1 wherein the first and second process routines are adapted and configured to determine the economic impact of the future long-term care costs on the personal assets as a function of time and to output the economic impact for at least a first and second point in time.

3. The computer program product of claim 2 wherein the second point in time represents a point in time after the long-term care costs have hypothetically ceased being incurred, the economic impact for the second point in time being greater than the economic impact at the time the long-term care costs cease due to the unrealized investment opportunity calculations.

4. The computer program product of claim 1 further comprising an output routine for facilitating the graphical display of the insured and uninsured economic impacts in a manner allowing proportional visualization of the magnitudes thereof.

5. A computer program product having embodied thereon machine readable and machine executable software, comprising:

a storage routine adapted and configured to store, in a storage device, user-controlled data indicative of a hypothetical scenario of future long-term care costs and of one of a plurality of long-term care insurance options;

a first process routine adapted and configured for using the stored data to determine an insured economic impact of the long-term care costs on personal assets, the first process routine adapted and configured for using the stored data to determine the insured economic impact including calculations of a first portion of the personal assets hypothetically sold to pay the long-term care costs, calculations to account for periodic premium payments and monetary insurance benefits received, calculations to account for hypothetical tax consequences by assuming that any long-term care costs in excess of the monetary insurance benefits and all of the insurance premiums are paid for by the sale of the first portion of the personal assets, and calculations to account for hypothetical unrealized investment opportunity resulting from an absence of the first portion of the personal assets due to the sale the first portion of the personal assets; and a second process routine adapted and configured for using the stored data to determine an uninsured economic impact of the long-term care costs on the personal assets, the second process routine adapted and configured for using the stored data to determine the uninsured economic impact including calculations of a second portion of the personal assets hypothetically sold to pay the long-term care costs and calculations to account for hypothetical unrealized investment opportunity resulting from an absence of the second portion of the personal assets due to the sale of the second portion of the personal assets, the uninsured economic impact being independent of any periodic premium payments and any monetary insurance benefits received.

6. The computer program product of claim 5 further comprising an output routine for facilitating the graphical display of the insured and uninsured economic impacts in a manner allowing proportional visualization of the magnitudes thereof.

7. The computer program product of claim 5 wherein the second process routine includes calculations to account for hypothetical tax consequences resulting from the sale of the second portion of the personal assets.

8. The computer program product of claim 7 wherein the second process routine determines the uninsured economic impact as a function of time and is configured to output the uninsured economic impact for at least first and second points in time, and wherein the first process routine determines the insured economic impact as a function of time and is configured to output the insured economic impact for at least the first and the second points in time.

9. The computer program product of claim 8 wherein the second point in time represents a point in time after the long-term care costs have hypothetically ceased being incurred, the insured and uninsured economic impacts for the second point in time being greater than the insured and uninsured economic impacts respectively at the time the long-term care costs cease due to the unrealized investment opportunity calculations.

10. The computer program product of claim 8 further comprising an output routine for facilitating graphical display of the insured and uninsured economic impacts in a manner allowing proportional visualization of the magnitudes thereof.

11. A computer program product having embodied thereon machine readable and machine executable software, comprising:

a storage routine adapted and configured to store, in a storage device, user-controlled data indicative of a hypothetical scenario of future long-term care costs and of one of a plurality of long-term care insurance options;

a first process routine adapted and configured for using the stored data to determine an insured economic impact of the future long-term care costs on personal assets as a function of time, the first process routine being configured to output the insured economic impact for at least first and second points in time and to calculate a first portion of the personal assets hypothetically sold to pay the long-term care costs at each of the points in time, the first process routine including calculations to account for hypothetical tax consequences resulting from the sale of each of the first portions of the personal assets, the hypothetical tax consequences being accounted for in the first process routine by assuming that any long-term care costs in excess of the monetary insurance benefits and all of the insurance premiums are paid for by the sale of each of the first portions of the personal assets at the respective first and second points in time, the first process routine including calculations to account for hypothetical unrealized investment opportunity resulting from an absence of the first portions of the personal assets due to the sale the first portions of the personal assets; and a second process routine adapted and configured for using the stored data to determine an uninsured economic impact of the long-term care costs on the personal assets as a function of time, the second process routine being configured to output the uninsured economic impact for at least the first and second points in time and to calculate a second portion of the personal assets hypothetically sold to pay the long-term care costs at each of the points in time, the second process routine including calculations to account for hypothetical tax consequences resulting from the sale of each of the second portions of the personal assets and calculations to account for hypothetical unrealized investment opportunity resulting from an absence of the second portions of the personal assets due to the sale of the second portions of the personal assets.

12. The computer program product of claim 11 wherein the first process routine includes calculations to account for periodic premium payments and monetary insurance benefits received, and wherein the uninsured economic impact is independent of any periodic premium payments and any monetary insurance benefits received.

13. A method comprising:

acquiring user-controlled data indicative of a hypothetical scenario of future long-term care costs and of one of a plurality of long-term care insurance options;

determining an insured economic impact of the long-term care costs on personal assets based on the acquired data, the determination of the insured economic impact including performing calculations of a first portion of the personal assets hypothetically sold to pay the long-term care costs, calculations to account for hypothetical unrealized investment opportunity resulting from an absence of the first portion of the personal assets due to the sale of the first portion of the personal assets, and calculations to account for periodic premium payments and monetary insurance benefits received;

determining an uninsured economic impact of the long-term care costs on the personal assets based on the acquired data, the determination of the uninsured economic impact including performing calculations of a second portion of the personal assets hypothetically sold to pay the long-term care costs and calculations to account for hypothetical unrealized investment opportunity resulting from an absence of the second portion of the personal assets due to the sale of the second portion of the personal assets, the uninsured economic impact being independent of any periodic premium payments and any monetary insurance benefits received; and creating a machine readable data file that is dependent upon the above-recited steps.

14. The method of claim 13 wherein the steps of determining an insured economic impact and of determining an uninsured economic impact are generally made simultaneously.

* * * * *